United States Patent
Lien

(10) Patent No.: US 9,986,780 B2
(45) Date of Patent: Jun. 5, 2018

(54) METHOD FOR MANUFACTURING AN INTEGRALLY-FORMED SHOE HAVING NO MACHINE SEWING

(71) Applicant: Kurt Lien, Taipei (TW)

(72) Inventor: Kurt Lien, Taipei (TW)

( * ) Notice: Subject to any disclaimer, the term of this patent is extended or adjusted under 35 U.S.C. 154(b) by 299 days.

(21) Appl. No.: 14/827,816

(22) Filed: Aug. 17, 2015

(65) Prior Publication Data

US 2016/0044985 A1 Feb. 18, 2016

(30) Foreign Application Priority Data

Aug. 18, 2014 (TW) .............................. 103128219 A

(51) Int. Cl.
  *B29C 65/02* (2006.01)
  *A43B 1/04* (2006.01)
  (Continued)

(52) U.S. Cl.
  CPC .................. *A43B 1/04* (2013.01); *A43B 9/02* (2013.01); *A43D 3/02* (2013.01); *A43D 3/04* (2013.01);
  (Continued)

(58) Field of Classification Search
  None
  See application file for complete search history.

(56) References Cited

U.S. PATENT DOCUMENTS 2,440,393 A   4/1948   Clark
2,641,004 A   6/1953   Whiting et al.
(Continued)

FOREIGN PATENT DOCUMENTS

CN   1981660 A      6/2007
CN   102415648 A    4/2012
(Continued)

OTHER PUBLICATIONS

Search Report for Taiwan Patent Application No. 103128219; dated Aug. 14, 2015.

*Primary Examiner* — Edmund Lee

(74) *Attorney, Agent, or Firm* — Koppel, Patrick, Heybl & Philpott

(57) ABSTRACT

An integrally-formed shoe having no machine sewing and a manufacturing method thereof are provided. A structure of the shoe includes: a lining sock body that uses a knitting manner and includes an opening; and a surface sock body that uses a knitting manner and includes an opening and a sole, where the opening of the lining sock body is nested inside the surface sock body; the two sock bodies are properly mounted on a sock machine; low melting point yarn and nylon elastic filament are mixed into knitting of the lining sock body; low melting point yarn, nylon elastic filament, and set yarn are mixed into knitting of the surface sock body; after the sock machine weaves and molds the two sock bodies into a whole, a hollow mold is nested inside the surface sock body; the whole is heated and baked to slightly damage surface tissues of the yarn, and is then cooled to make the set yarn in knitwear be reorganized and extended according to the shape of an external fixing mold, to present a predetermined pattern; and after the surface sock body presents the predetermined pattern, the sole is directly bonded to the bottom of the surface sock body so as to achieve bonding of the sole and the surface sock body, to complete the integrally-formed shoe having no machine sewing, so that a user feels more comfortable due to no machine sewing.

9 Claims, 5 Drawing Sheets

(51) Int. Cl.
*B29C 65/78* (2006.01)
*A43D 25/20* (2006.01)
*A43D 86/00* (2006.01)
*A43B 9/02* (2006.01)
*A43D 3/02* (2006.01)
*A43D 3/04* (2006.01)

(52) U.S. Cl.
CPC ............ *A43D 25/20* (2013.01); *A43D 86/00* (2013.01); *B29C 65/02* (2013.01); *B29C 65/78* (2013.01)

(56) References Cited

U.S. PATENT DOCUMENTS

| | | | | |
|---|---|---|---|---|
| 3,035,291 | A | * | 5/1962 | Bingham, Jr. ....... A41B 11/007 12/142 RS |
| 3,324,220 | A | * | 6/1967 | Stansfield .......... B29D 35/0018 264/230 |
| 4,194,308 | A | * | 3/1980 | Karlsson ................. A43B 3/02 12/142 G |
| 5,325,541 | A | | 7/1994 | Willard |
| 9,675,134 | B2 | * | 6/2017 | Kosui ................. A43B 17/003 |
| 2004/0118018 | A1 | * | 6/2004 | Dua ........................ A43B 1/04 36/45 |
| 2014/0150292 | A1 | | 6/2014 | Podhajny et al. |

FOREIGN PATENT DOCUMENTS

| | | |
|---|---|---|
| CN | 103625191 A | 3/2014 |
| CN | 103908037 A | 7/2014 |
| JP | H0326602 | 2/1991 |
| JP | 2012504511 A | 2/2012 |
| KR | 100737426 B1 | 7/2007 |
| WO | WO2014085206 A1 | 6/2014 |
| WO | WO2013108506 A1 | 5/2015 |

* cited by examiner

METHOD FOR MANUFACTURING AN INTEGRALLY-FORMED SHOE HAVING NO MACHINE SEWING

This application claims the benefit and priority of Taiwanese Application No. 103128219, filed on Aug. 18, 2014, which is fully incorporated herein by reference in its entirety.

TECHNICAL FIELD

The present invention relates to a shoe and a manufacturing method thereof, and particularly to an integrally-formed shoe having no machine sewing that can allow users to feel more comfortable when wearing the shoes.

RELATED ART

According to statistics, 60% Taiwanese have had foot pain problems, and up to 58% shoes make people feel uncomfortable or are not fitted, so the importance of foot health should be further understood. People walk every day, foot care is especially important, and increasingly more people understand that a pair of comfortable shoes is absolutely helpful to the feet. Good-quality shoes have a great impact on performance of work and study during the day; and if a person does not pay attention to foot care for a long time, he/she is prone to mood swings and other body phenomena, and operation of an immune system may further be affected, which is likely to cause colds and sickness.

Foot care and diet are both basic physiological needs, and everyone needs foot care. In the busy pace of life, it is a difficult task for most consumers to take time to care the feet, and thus, to manufacture a pair of comfortable shoes is the most important subject of the present invention.

SUMMARY

Given that the traditional shoes still have imperfections, the inventors have finally developed an integrally-formed shoe having no machine sewing after years of research and development, plus an exclusive technology, and by testing the feet of consumers with various materials. A structure of the shoe includes: a lining sock body that uses a knitting manner and includes an opening; and a surface sock body that uses a knitting manner and includes an opening and a sole, where the opening of the lining sock body is nested inside the surface sock body; the two sock bodies are properly mounted on a sock machine; low melting point yarn and nylon elastic filament are mixed into knitting of the lining sock body; low melting point yarn, nylon elastic filament, and set yarn are mixed into knitting of the surface sock body; after the sock machine weaves and molds the two sock bodies into a whole, a hollow mold is nested inside the surface sock body, and the whole is heated and baked to slightly damage surface tissues of the yarn and is then cooled to make the set yarn in knitwear be reorganized and extended according to the shape of an external fixing mold, to present a predetermined pattern; and after the surface sock body presents the predetermined pattern, the sole is directly bonded to the bottom of the surface sock body so as to achieve bonding of the sole and the surface sock body, to complete an integrally-formed shoe having no machine sewing, so that a user feels more comfortable due to no machine sewing.

Main objectives of the present invention are as follows:
1. One advantage of the present invention lies in that, uppers and soles have no seams, so that wearers feel more comfortable; this process is especially used in children's footwear product series, and is extended in manufacturing of indoor shoes, outdoor shoes with EVA TPR rubber and plastic soles, and even seamless leather shoe products after post-processing.

2. Another advantage of the present invention lies in that, because socks are intended to enhance the comfortableness when a wearer walks with shoes, the present invention is based on mixing low melting point yarn and nylon elastic filament into knitting of socks, a whole sock body is heated and baked to slightly damage the characteristics of raw materials and surface tissues of the yarn, and is then cooled to make the set yarn in knitwear be reorganized and extended according to the shape of a mold, to form another product.

3. A further advantage of the present invention lies in that, clipped leather or PVC artificial leather can pasted on the surface sock body, or printing (silk cloth printing or mold printing) can be printed (offset-printed), heat-transfer printed or embroidered on the surface sock body, to achieve different appearances. Different proportions of nylon elastic fiber (Lycra/Spandex) and low melting point yarn can also be mixed for the surface sock body according to the thickness of main yarn, for example, filament yarn is changed from a piece of main yarn plus a piece of nylon plus a piece of set yarn into a piece of coarse main yarn plus two pieces of nylon yarn plus two pieces of set yarn; and if a mixing ratio of each kind of yarn is changed as required, the surface sock body shows different styles and changes due to different thickness of the yarn.

Preferably, the hollow mold is provided with one to a plurality of steam holes on its surface, so as to heat the sock body.

Preferably, the hollow mold is further provided with a plurality of positioning pinholes, and the positioning pinholes are located on the edge of and at the bottom of the hollow shoe mold, so as to avoid that surface positions of the surface sock body move to generate flaws in the case of shrinkage and shaping.

Preferably, the sock body is made from fiber cotton, combed cotton, mercerized cotton, spandex, lycra, polyamide fibers, nylon, acrylic fibers, polypropylene, terylene, viscose fibers, tencel, bamboo fibers, modal, linen, or supima.

Preferably, at the bottom of the sole, a glue is be used to bond non-slip particles, injection-molded soles and sewn soles, so that the shoes can be enhanced in an anti-slipping effect.

Preferably, leather or PVC artificial leather is pasted on the surface sock body, or printing is printed (offset-printed), heat-transfer printed or embroidered on the surface sock body.

Preferably, the sole is a rubber sole, a plastic sole, a TPR sole, a polyurethane sole (PU sole), a leather sole, an EVA sole (commonly known as a foam sole), or a composite sole.

Preferably, the hollow mold and the external fixing mold are made from iron, copper or aluminum.

Preferably, a waterproof and dustproof material or coating is added after the surface sock body presents the predetermined pattern.

In order to enable the examiner to understand the characteristics of the present invention more easily, reference should be made to the following accompanying drawings and descriptions about embodiments of the present invention. The following embodiments are used for further describing viewpoints of the present invention in detail, but not for limiting the scope of the present invention with any viewpoint; the following figures only describe the basic concept of the present invention with simplified schematic

DETAILED DESCRIPTION

Figure 1:
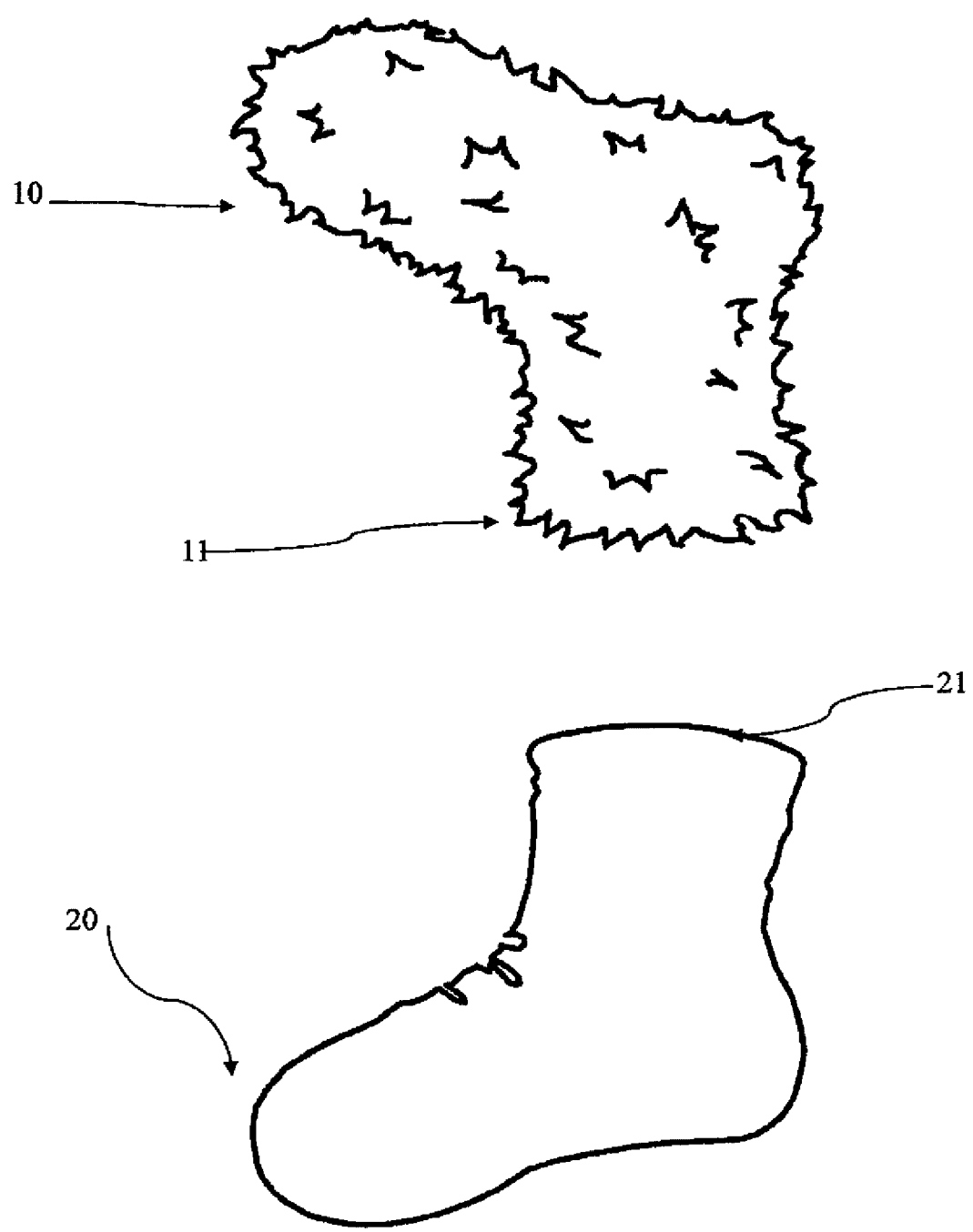
FIG. 1 is a structural view of a sock body of an integrally-formed shoe having no machine sewing according to the present invention.
Figure 2:
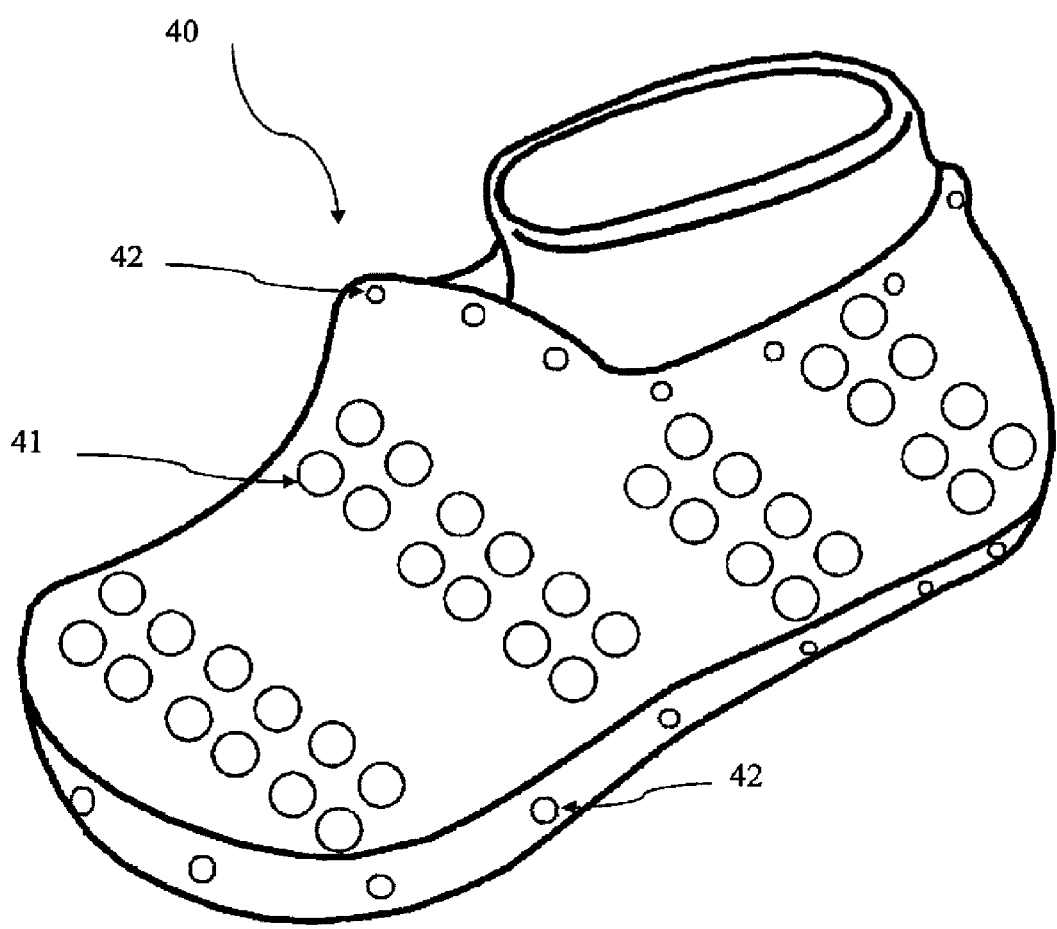
FIG. 2 is a view of a hollow mold of an integrally-formed shoe having no machine sewing according to the present invention.
Figure 3:
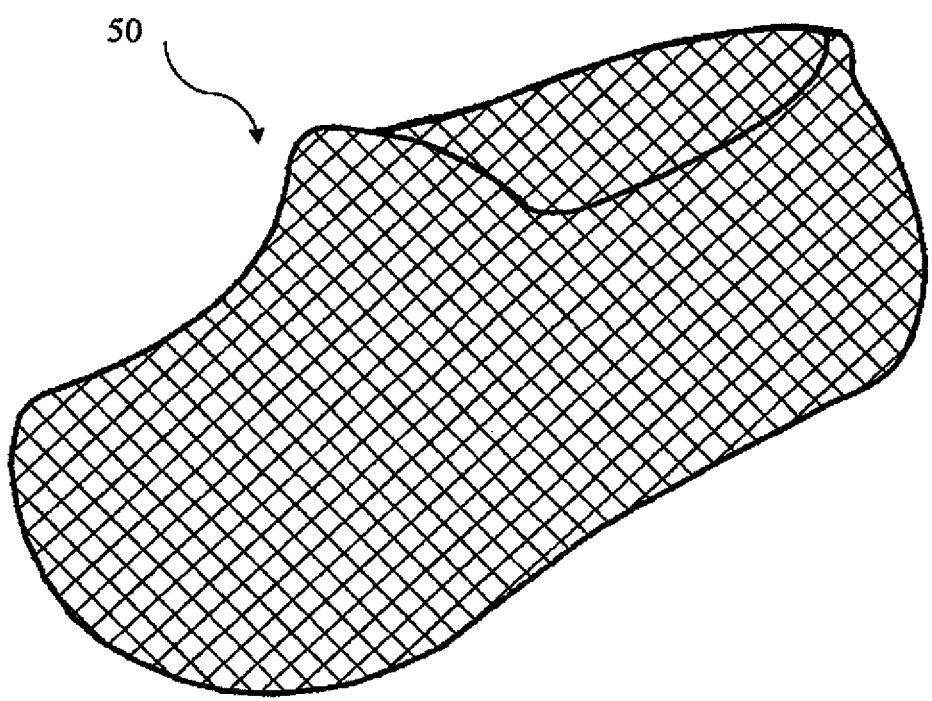
FIG. 3 is a view of an external fixing mold of an integrally-formed shoe having no machine sewing according to the present invention.
Figure 4:
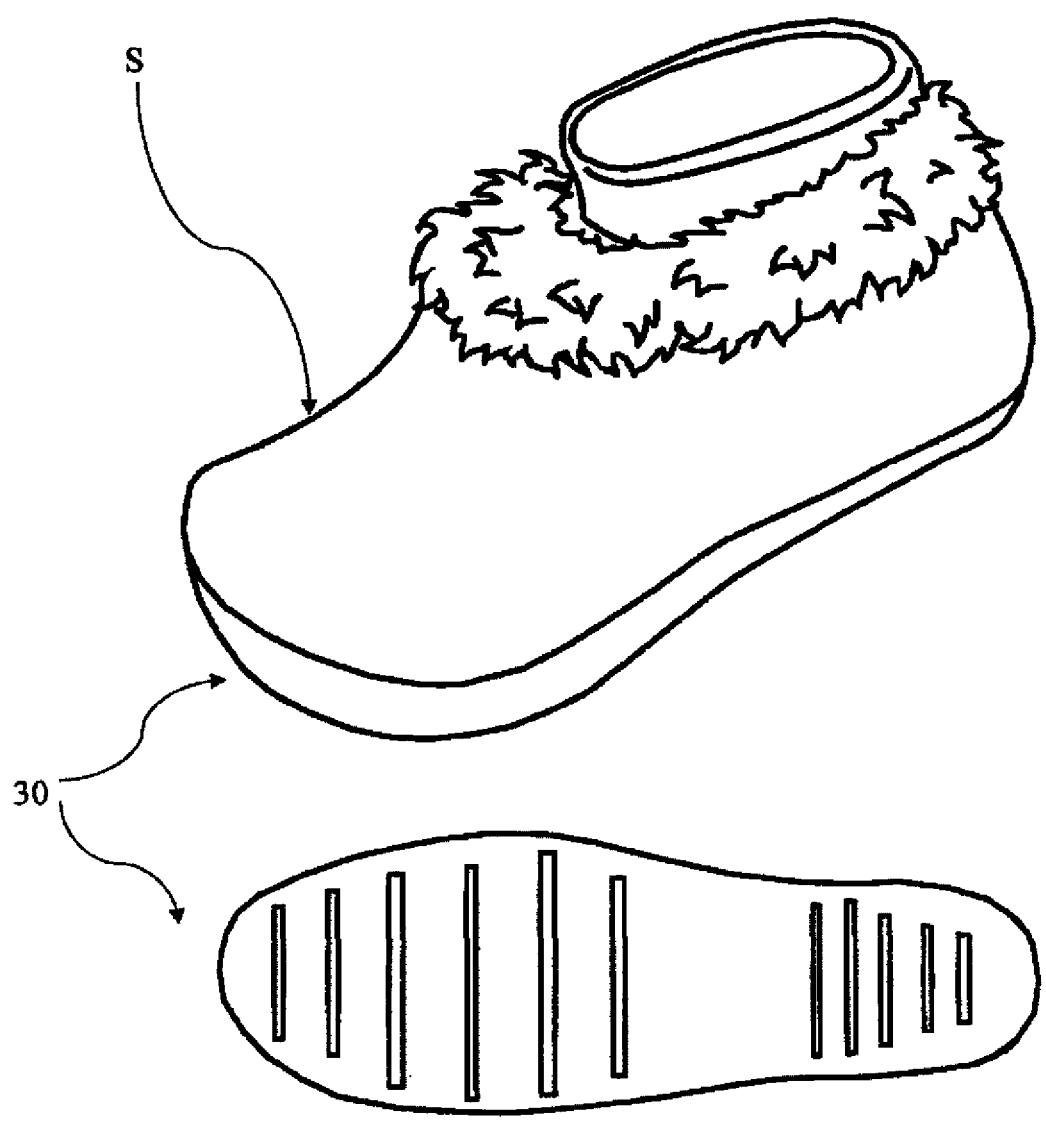
FIG. 4 is a completed view of an integrally-formed shoe having no machine sewing according to the present invention.

Referring to FIG. 1, FIG. 1 is a structural view of a sock body of an integrally-formed shoe having no machine sewing according to the present invention, whose structure includes: a lining sock body 10 that uses a knitting manner and includes an opening 11; and a surface sock body 20 that uses a knitting manner and includes an opening 21 and a sole 30. The opening 11 of the lining sock body 10 is nested inside the surface sock body 20; the two sock bodies are properly mounted on a sock machine; low melting point yarn and nylon elastic filament are mixed into knitting of the surface sock body 20; after the sock machine weaves and molds the two sock bodies into a whole, referring to FIG. 2, a hollow mold 40 is nested inside the surface sock body 20; as the hollow mold 40 has a plurality of steam holes 41 and a plurality of positioning pinholes 42, at first, needles are threaded through the integrally woven sock body and are inserted into the positioning pinholes 42, and then the whole is heated and baked to slightly damage surface tissues of yarn; referring to FIG. 3, and the whole is then cooled to make the set yarn in knitwear be reorganized and extended according to the shape of an external fixing mold 50, to present a predetermined pattern; referring to FIG. 4, after the surface sock body 20 presents the predetermined pattern, the sole 30 is directly bonded to the bottom of the surface sock body 20 so as to achieve bonding of the sole and the surface sock body 20, to complete an integrally-formed shoe S having no machine sewing, so that a user feels more comfortable due to no machine sewing.

Moreover, if the sock body is mainly used in manufacturing indoor shoes, it is washable.

Figure 5:
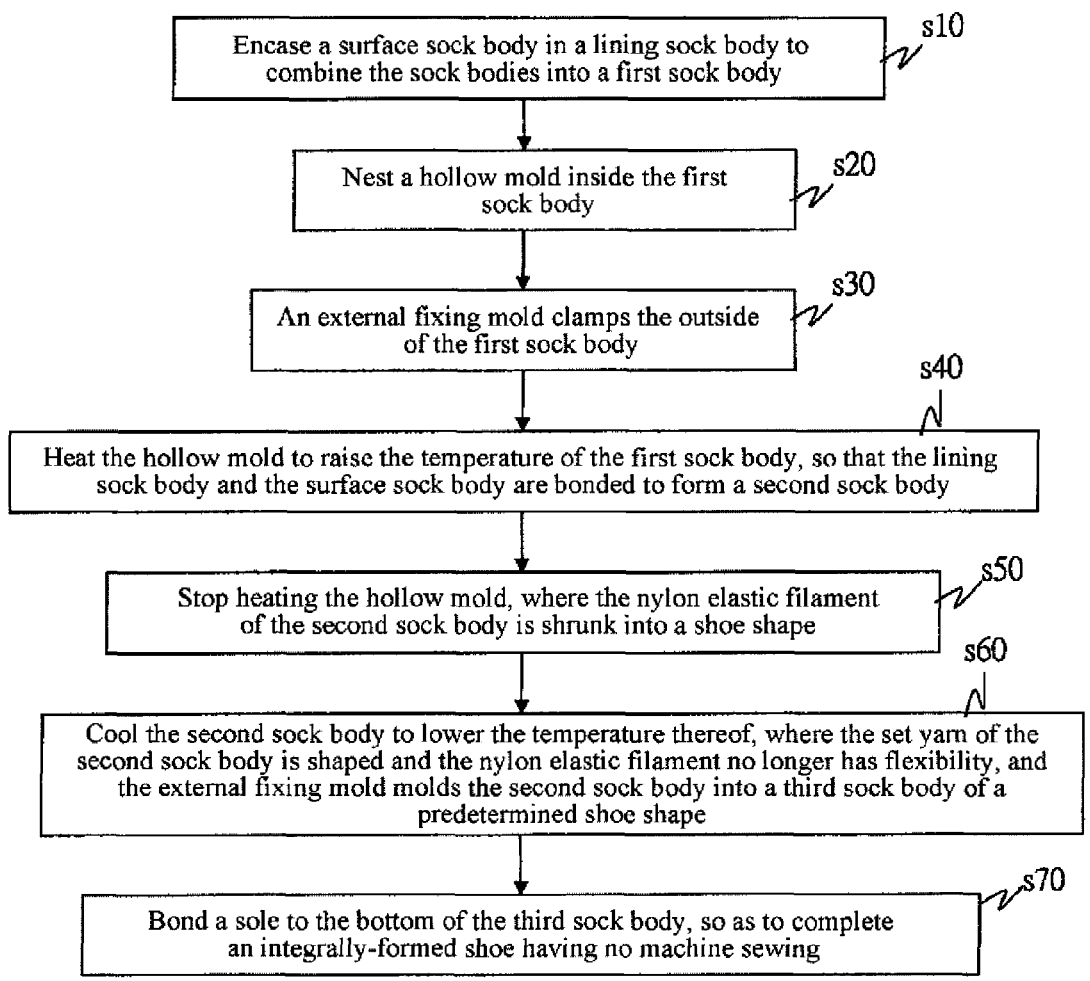
FIG. 5 is a schematic manufacturing flowchart of an embodiment of the present invention.

Referring to FIG. 5, FIG. 5 is a schematic manufacturing flowchart an embodiment of the present invention, the process including the following steps:

At first, a surface sock body 20 is encased in a lining sock body 10 with inside out, and one end of the lining sock body 10 is knitted to one end of the surface sock body 20 to form a first sock body, where the lining sock body 10 includes nylon elastic filament and low melting point yarn which is mixed into an outer layer, and the surface sock body 20 includes nylon elastic filament, and low melting point yarn and set yarn which are mixed into an inner layer, as shown in Step s10.

Next, a hollow mold 40 is nested inside the first sock body, where the hollow mold 40 is heatable, as shown in Step s20.

Then, an external fixing mold 50 clamps the outside of the first sock body, as shown in Step s30.

Next, the hollow mold 40 is heated to raise the temperature of the first sock body, to cause the low melting point yarn in the lining sock body 10 and the surface sock body 20 of the first sock body to be adhered to each other, so that the lining sock body 10 and the surface sock body 20 are bonded to form a second sock body, as shown in Step s40.

Afterwards, heating of the hollow mold 40 is stopped, where the nylon elastic filament of the second sock body is shrunk into a shoe shape, as shown in Step s50.

Next, the second sock body is cooled to lower the temperature thereof, where the set yarn of the second sock body is shaped and the nylon elastic filament no longer has flexibility, and the external fixing mold 50 molds the second sock body into a third sock body of a predetermined shoe shape, as shown in Step s60.

Finally, Step s70 is performed, that is, a sole 30 is boned to the bottom of the third sock body, so as to complete the integrally-formed shoe S having no machine sewing.

The above only describes the present invention in detail through a preferred embodiment; however, any modification and change made to the embodiment, for example, changes in the material of the sock body and in the material of the sole, should not depart from the spirit and scope of the present invention.

On the basis of the foregoing detailed descriptions, persons skilled in the art can understand that the present invention indeed can achieve the foregoing objectives and complies with the provisions of the Patent Law, and thus the invention patent application is filed in accordance with law.

What is claimed is:

1. A method for manufacturing an integrally-formed shoe having no machine sewing, comprising the following steps:

(a) encasing a surface sock body in a lining sock body with inside out, and knitting one end of the lining sock body to one end of the surface sock body to form a first sock body, wherein the lining sock body comprises nylon elastic filament and low melting point yarn which is mixed into an outer layer, and the surface sock body comprises nylon elastic filament, and low melting point yarn and set yarn which are mixed into an inner layer;

(b) nesting a hollow mold inside the first sock body, wherein the hollow mold is heatable;

(c) an external fixing mold clamping the outside of the first sock body while the hollow mold is inside the first sock body;

(d) heating the hollow mold to raise the temperature of the first sock body while the external fixing mold is clamped onto the outside of the first sock body and the hollow mold is inside the first sock body, to cause the low melting point yarn in the lining sock body and the surface sock body of the first sock body to be adhered to each other, so that the lining sock body and the surface sock body are bonded to form a second sock body;

(e) stopping heating the hollow mold, wherein the nylon elastic filament of the second sock body is shrunk into a shoe shape;

(f) cooling the second sock body after the heating has stopped and while the external fixing mold is clamped onto the outside of the first sock body and the hollow mold is inside the first sock body, wherein the set yarn of the second sock body is shaped and the nylon elastic filament no longer has flexibility, and the external fixing mold molding the second sock body into a third sock body of a predetermined shoe shape; and (g) bonding a sole to the bottom of the third sock body, so as to complete the integrally formed shoe having no machine sewing.

2. The method for manufacturing an integrally-formed shoe having no machine sewing according to claim 1, wherein the hollow mold is provided with one to a plurality of steam holes on its surface.

3. The method for manufacturing an integrally-formed shoe having no machine sewing according to claim 1, wherein the hollow mold is further provided with a plurality of positioning pinholes, and the positioning pinholes are located on the edge of and at the bottom of the hollow shoe mold.

4. The method for manufacturing an integrally-formed shoe having no machine sewing according to claim 1, wherein the sock body is made from fiber cotton, combed cotton, mercerized cotton, spandex, lycra, polyamide fibers, nylon, acrylic fibers, polypropylene, polyester, terylene, viscose fibers, tencel, bamboo fibers, modal, linen, or supima.

5. The method for manufacturing an integrally-formed shoe having no machine sewing according to claim 1, wherein at the bottom of the sole, a glue is used to bond non-slip particles, injection-molded soles and sewn soles.

6. The method for manufacturing an integrally-formed shoe having no machine sewing according to claim 1, wherein leather or PVC artificial leather is pasted on the surface sock body, or printing is printed (offset-printed), heat-transfer printed or embroidered on the surface sock body.

7. The method for manufacturing an integrally-formed shoe having no machine sewing according to claim 1, wherein the sole is a rubber sole, a plastic sole, a TPR sole, a polyurethane sole (PU sole), a leather sole, an EV A sole (commonly known as a foam sole), or a composite sole.

8. The method for manufacturing an integrally-formed shoe having no machine sewing according to claim 1, wherein the hollow mold and the external fixing mold are made from iron, copper or aluminum.

9. The method for manufacturing an integrally-formed shoe having no machine sewing according to claim 1, wherein a waterproof and dustproof material or coating is added after the surface sock body presents the predetermined shoe shape.

\* \* \* \* \*